(12) United States Patent
Aoyama et al.

(10) Patent No.: US 7,697,474 B2
(45) Date of Patent: Apr. 13, 2010

(54) USER THROUGHPUT GEOGRAPHICAL DISTRIBUTION ESTIMATING SYSTEM AND USER THROUGHPUT GEOGRAPHICAL DISTRIBUTION ESTIMATING METHOD

(75) Inventors: Akio Aoyama, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 456 days.

(21) Appl. No.: 11/813,296

(22) PCT Filed: Nov. 17, 2005

(86) PCT No.: PCT/JP2005/021097

§ 371 (c)(1),
(2), (4) Date: Jul. 3, 2007

(87) PCT Pub. No.: WO2006/075447

PCT Pub. Date: Jul. 20, 2006

(65) Prior Publication Data

US 2009/0003236 A1    Jan. 1, 2009

(30) Foreign Application Priority Data

Jan. 12, 2005    (JP) .............................. 2005-004626

(51) Int. Cl.
   *H04W 4/00*    (2006.01)
(52) U.S. Cl. ...................................... 370/328
(58) Field of Classification Search ........................ None
   See application file for complete search history.

(56) References Cited

U.S. PATENT DOCUMENTS

| 7,308,270 B2 * | 12/2007 | Lastinger et al. ............. 455/450 |
| 2003/0162539 A1 * | 8/2003 | Fiut et al. .................... 455/424 |
| 2005/0190732 A1 * | 9/2005 | Douglas et al. ............. 370/338 |

FOREIGN PATENT DOCUMENTS

| JP | 2001-94502 A | 4/2001 |
| JP | 2003-114911 A | 4/2003 |
| JP | 2000-224094 A | 10/2003 |
| JP | 2003-298498 A | 10/2003 |
| JP | 2003-298510 A | 10/2003 |
| JP | 2004-112597 A | 4/2004 |
| JP | 2004-112667 A | 4/2004 |

* cited by examiner

*Primary Examiner*—Anh-Vu Ly
(74) *Attorney, Agent, or Firm*—Sughrue Mion, PLLC

(57) ABSTRACT

A system is provided for estimating the geographical distribution of user throughput in a cellular system, including user terminals and a base station for effecting wireless packet communications with user terminals inside in its own cell using a shared channel. Reception quality estimating means (11) estimates the reception quality of the shared channel at the location of a user terminal in the cell. Traffic information reading means (12) reads the traffic information on the estimation target area in which estimation of the reception quality was performed. User throughput estimating means (13) estimates the user throughput at the location of a user terminal in the cell, using the user throughput calculating function that receives as its input the reception quality of the shared channel at the location of the user terminal in the cell and the traffic information on the estimation target area and calculates user throughput.

16 Claims, 11 Drawing Sheets user throughput U=f2 (reception quality of shared channel, traffic information on estimation target area, packet scheduler type, ratio of user terminals using shared channel)

us 7,697,474 B2

USER THROUGHPUT GEOGRAPHICAL DISTRIBUTION ESTIMATING SYSTEM AND USER THROUGHPUT GEOGRAPHICAL DISTRIBUTION ESTIMATING METHOD

TECHNICAL FIELD

The present invention relates to a user throughput geographical distribution estimating system and user throughput geographical distribution estimating method, and in particular relates to a technology for estimating user throughput in a cellular system for performing wireless packet communications using a shared channel between a base station and user terminals.

BACKGROUND ART

Conventionally, there have been cellular systems including user terminals and a base station for performing wireless packet communications with user terminals in its own cell using a shared channel.

In a cellular system, user throughput presents a different value depending on the geographical features around the base station. User throughput is a value that is measured at a user terminal, and is represented by the number of bits of packets that are received by the user terminal from the base station per unit time.

As a method for estimating the geographical distribution of user throughput in a cellular system, it is a common practice that a computer is used to perform a system level simulation of the cellular system for a continuous period of time. The reason is that, because a shared channel is used in common by user terminals in a cell under high-speed control, it is impossible to obtain correct estimation of user throughput unless the shared process is simulated at a high temporal resolution over a continuous period of time while performing a detailed simulation of the process of wireless packet communications including upper layers.

A conventional method of estimating the geographical distribution of user throughput will be described with reference to FIG. 1.

As shown in FIG. 1, a system level simulation of a cellular system over a continuous period of time is performed by system level simulator 300.

System level simulator 300 receives as its input the base station configuration, the amount of traffic of packets that are generated when each user terminal makes a download request, the total number of users in the cell. Here, the base station configuration means the settings and status of the base station, including, for example, the position of the base station, transmission power, antenna pattern, antenna azimuth, antenna tilt, the type of the packet scheduler for scheduling the priority order of packet transmission processes to user terminals and the like.

System level simulator 300, based on the aforementioned input values, estimates the reception quality of the shared channel at the location of each user terminal, and performs continuous simulation of a wireless packet communications process that is close to reality including protocol upper layers, to thereby estimate user throughput. Here, as the reception quality of the shared channel, reception SIR (Signal to Interference power Ratio) which represents the ratio of the shared channel reception signal power to the interference signal power is usually used.

Next, the procedure of a system level simulation over a continuous period of time by system level simulator 300 will be described in detail.

System level simulator 300 simulates the following first to fifth steps when it uses the HSDPA (High SPEED Downlink Packet Access) scheme for high speed downlink access in W-CDMA (Wide band-Code Division Multiple Access) as a wireless packet communication scheme for the downlink from the base station to user terminals.

The first step: user terminals are generated at various positions. Then, the user terminals are caused to make traffic requests to the base station for transmitting packets through the shared channel. Here, the amount of traffic of the requested packets is the traffic amount being generated by the aforementioned user terminals.

The second step: the reception quality of the shared channel at the position of each user terminal is estimated. To explain in detail, for each user terminal, the interference wave signal power of the packets having been received from multiple base stations is calculated repeatedly, so as to estimate and calculate the reception quality of HS-PDSCH (High Speed-Physical Downlink Shared CHannel) as the shared channel based on the calculated result.

The third step: based on the amount of traffic generated by each user terminal, the reception quality of the shared channel at the position of each user terminal and the packet scheduler at the base station, packets are transmitted from the base station to each user terminal, using the shared channel.

The fourth step: based on the number of bits of the packets having been received from the base station, user throughput is calculated for each user terminal. Once the fourth step is completed, the operation returns to the first step. At this moment, the position of each user terminal is updated in accordance with the speed at which the user terminal moves, and once again the first to fourth steps are repeated.

The fifth step: user throughputs as the calculated result at the fourth step are averaged. Then, the position of each user terminal is output and the average value of the user throughputs of all the user terminals are output as a user throughput estimation.

System level simulator 300 executes the first to fourth steps every 2 ms in real time. System level simulator 300 also performs simulation of the first to fourth steps every 2 ms for periods of one hour or longer in order to obtain statistically reliably user throughput estimation.

As a result of this, accuracy of user throughput estimation is improved. On the contrary, however, an enormous amount of processing is needed for simulation of the first to fourth steps every 2 ms for periods of one hour or longer, so the time for estimating user throughput becomes longer.

Further, since system level simulator 300 executes a process of averaging user throughputs at the fifth step in order to display the geographical distribution of user throughput, the time for estimating user throughput becomes further longer.

Taking a long time for execution of estimating user throughput gives rise to the following problem especially when the proper values for the base station configuration are examined. When the proper values for the base station configuration are deliberated, a system level simulation needs to be effected every time the base station configuration is altered. Accordingly, long-time system level simulation should be repeated many times until the proper values for the base station configuration is determined, so that the time for deliberation becomes extremely long.

Also, there are other conventional methods for estimating throughput: a method of determining the propriety of starting communication by estimating throughput (e.g., see Japanese Patent Application Laid-open 224094/2000), a method of improving system throughput (e.g., see Japanese Patent Application Laid-open 298498/2003), a method of realizing a base station capable of estimating packet quality (e.g., see Japanese Patent Application Laid-open 112597/2004) and the like.

DISCLOSURE OF INVENTION

It is therefore an object of the present invention to provide a user throughput geographical distribution estimating system and user throughput geographical distribution estimating method, which enables estimation of the geographical distribution of user throughput in a cellular system in a short time with precision.

The user throughput geographical distribution estimating system of the present invention is applied to estimate the geographical distribution of user throughput in a cellular system including user terminals and a base station for effecting wireless packet communications with user terminals inside in its own cell using a shared channel.

A user throughput geographical distribution estimating system of the present invention comprises: a reception quality estimating means for estimating the reception quality of the shared channel at the location of a user terminal in the cell; a traffic information reading means for reading the traffic information on the estimation target area in which estimation of the reception quality was performed; and a user throughput estimating means for estimating user throughput at the location of a user terminal in the cell, using a user throughput calculating function that receives as its input the reception quality of the shared channel at the location of the user terminal in the cell and traffic information on the estimation target area and calculates user throughput.

Since a function like the user throughput calculating function has a definite output value that corresponds to its input, it is possible to determine the output value at the moment of time when the input is given. Therefore, according to the configuration using the function as above, it is not necessary to simulate in detail the process of user terminals sharing the shared channel based on the control of the packet scheduler, at a high temporal resolution, in contrast to a conventional configuration using a system level simulation, hence it is possible to estimate the geographic distribution of user throughput in a short time.

Also, the traffic information reading means may be constructed so as to read the traffic information on the estimation target area, measured at the base station or at the wireless network controller. Since this configuration makes it possible to use a value that is close to reality as the input to the user throughput calculating function, it is possible to improve the estimation accuracy of user throughput.

It is also possible to provide a configuration that further includes a user terminal measuring means that travels in the cell for making actual measurement of the reception quality of the shared channel and the user throughput at the locations of user terminals in the cell, and the user throughput estimating means includes a function correcting means for correcting the user throughput calculating function in accordance with the relationship between the measurement of the reception quality of the shared channel and the measurement of the user throughput. According to this configuration, it is possible to use the user throughput calculating function that was corrected in accordance with the relationship between the measurement of the reception quality of the shared channel and the measurement of user throughput. Hence, it is possible to improve the estimation accuracy of user throughput.

BEST MODE FOR CARRYING OUT THE INVENTION

Referring next to the drawings, exemplary embodiments of the user throughput geographical distribution estimating system of the present invention will be described. Here, the following description will be made on the assumption that the downlink wireless packet communication from the base station to user terminals employs the HSDPA scheme of a W-CDMA.

Exemplary Embodiment 1

Figure 1:
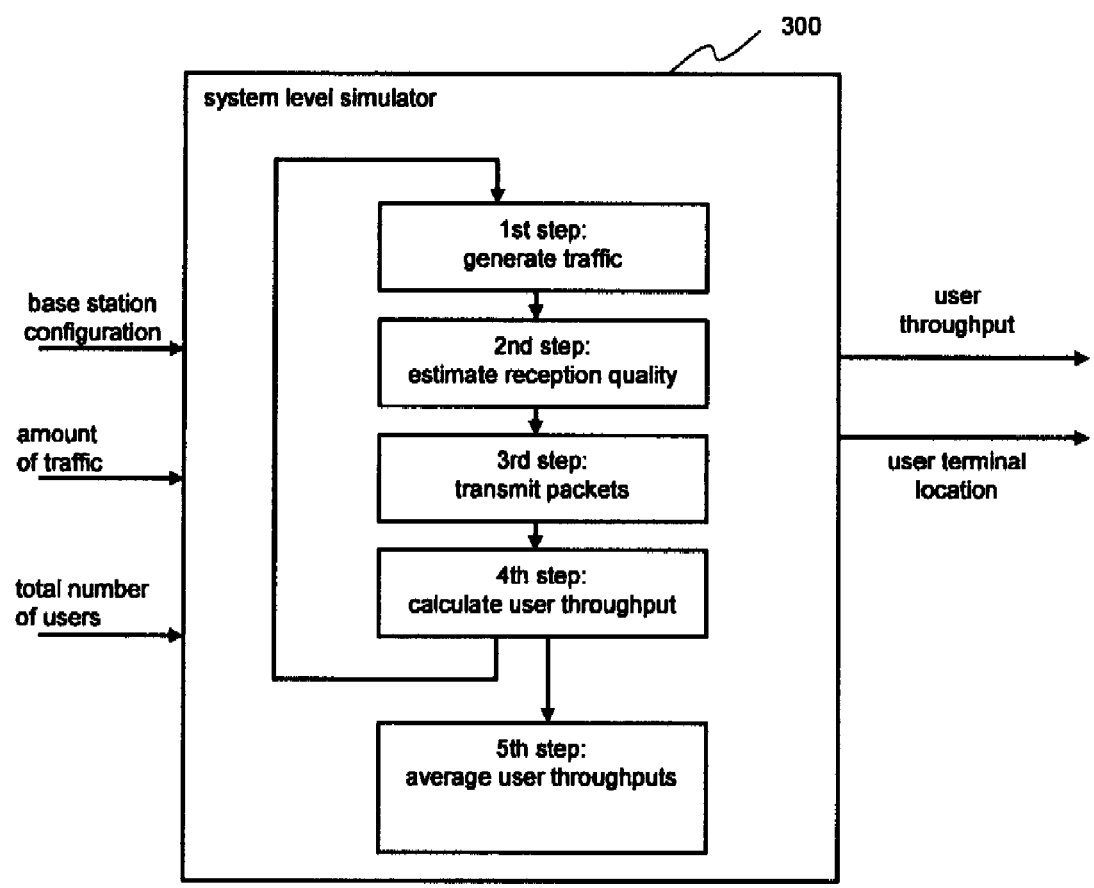
FIG. 1 is a diagram for explaining a conventional user throughput geographical distribution estimating method.
Figure 2:
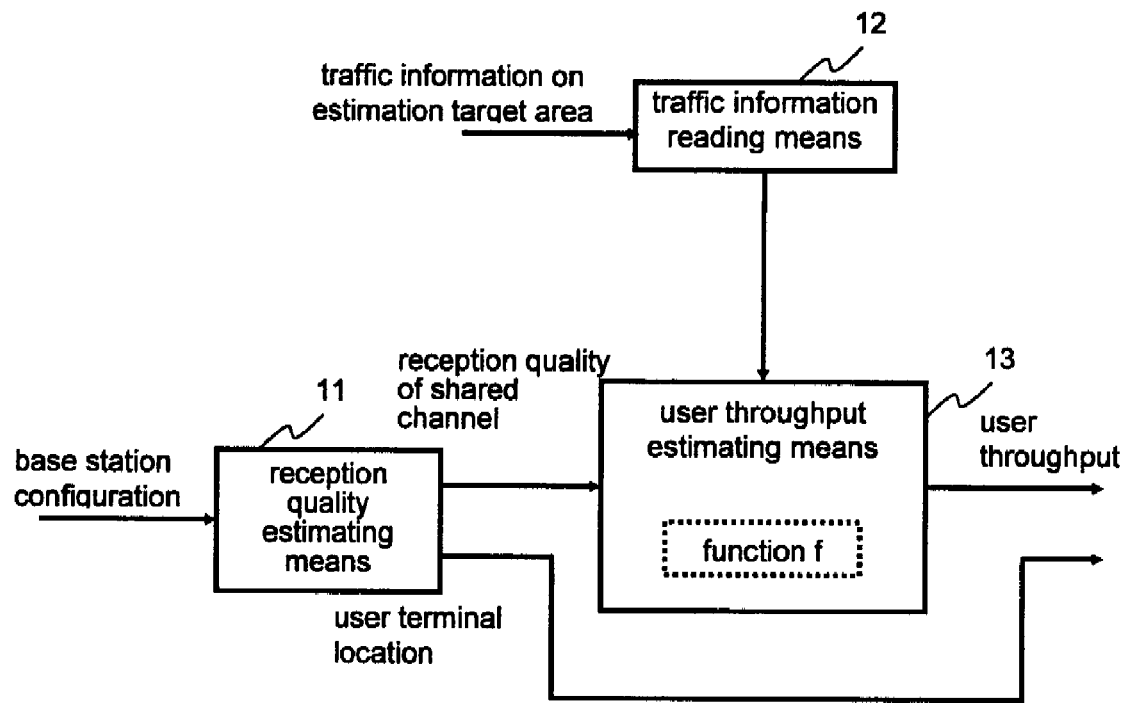
FIG. 2 is a block diagram showing a configuration of a user throughput geographical distribution estimating system according to exemplary embodiment 1 of the present invention.

FIG. 2 is a block diagram showing a configuration of a user throughput geographical distribution estimating system according to exemplary embodiment 1 of the present invention. Here, the cellular system to which the present exemplary embodiment is applied is a cellular system including user terminals and a base station for effecting wireless communications with user terminals in its own cell using a shared channel.

Referring to FIG. 2, the user throughput geographical distribution estimating system according to the present exemplary embodiment includes reception quality estimating means 11, traffic information reading means 12 and user throughput estimating means 13.

Reception quality estimating means 11 assumes that there exist user terminals at various locations in the cell. On this assumption, reception quality estimating means 11 calculates propagation loss between the base station and each user terminal based on the position of the base station that was input as the base station configuration and the position of each user terminal in the cell. Here, the propagation loss is derived by substituting the distance between base station and each user terminal in a predetermined propagation equation.

Further, reception quality estimating means 11, based on the packet transmission power at the shared channel, antenna pattern and antenna azimuth which were input as the base station configuration and the calculated result of the propagation loss which was calculated above, estimates the reception quality of the shared channel at the location of each user terminal in the cell. Here, it is assumed that received SIR is used as the reception quality.

Reception quality estimating means 11 outputs the location of each user terminal in the cell and the reception quality of the shared channel at that location. Of these, the reception quality of the shared channel is output to user throughput estimating means 13.

Traffic information reading means 12 reads from the outside the traffic information on the estimation target area in which reception quality was estimated by reception quality estimating means 11, and outputs the read traffic information to user throughput estimating means 13. The traffic information on the estimation target area indicates the load imposed on the estimation target area by the packets generated by the user terminals existing in the estimation target area.

For example, as an indicator for downlink traffic information in W-CDMA, the transmission power of the base station is usually used. In the downlink, as the number of user terminals in the cell increases, the total transmission power that the base station uses for packet transmission to user terminals in the cell increases. That is, traffic information is a quantitative value related to the number of user terminals in the cell.

For this reason, description of exemplary embodiments 1 to 4 of the present invention will be made by defining the traffic information on the estimation target area as the number of user terminals in the cell. Here, it is assumed that this traffic information takes a value greater than '0'.

User throughput estimating means 13 incorporates user throughput calculating function f that receives as its input value, the reception quality of the shared channel and the traffic information on the estimation target area and calculate user throughput U.

In response to the input of the reception quality of the shared channel output from reception quality estimating means 11 and the traffic information on the estimated target area output from traffic information reading means 12, user throughput estimating means 13 calculates the user throughput at the position of each user terminal in the cell using the aforementioned user throughput calculating function f and outputs the estimated result of user throughput.

User throughput calculating function f has been previously prepared based on the estimated result of user throughput by system level simulation, the actual measurement of user throughput received from a wireless network controller, the approximation-analyzed user throughput result and the like, and is incorporated in user throughput estimating means 13.

When user throughput calculating function f is approximated and formulated as a continuous function having the reception quality of the shared channel and the traffic information on the estimation target area as its input values, the estimating process, when there exist continuous input values, can be made easy.

User throughput has such a qualitative nature that user throughput increases when the reception quality of the shared channel is high and user throughput decreases when the traffic is high. From this fact, it is possible to use the following equation 1 as an example of user throughput calculating function f.

$$U = f(SIR, Load_{cell}) = C \times \frac{SIR^A}{Load_{cell}^B} \qquad \text{[Equation 1]}$$

In equation 1, U represents user throughput, SIR the reception quality of the shared channel, $Load_{cell}$ the traffic information on the estimation target area (=the number of user terminals in the cell; $Load_{cell}>0$), A an arbitrary constant used as the power, B an arbitrary constant used as the power and C an arbitrary constant.

As described above, if the reception quality of the shared channel is high, the user throughput increases. This is why equation 1 takes the form in which its numerator is given with an exponential value of the shared channel reception quality. Also, if the traffic becomes high, the user throughput decreases. This is why equation 1 takes the form in which its denominator is given with an exponential value of the traffic information. Here, arbitrary constants A, B and C need to be previously adjusted in order to approximate user throughput calculating function f to the result estimated by system level simulation or the like.

Figure 3:
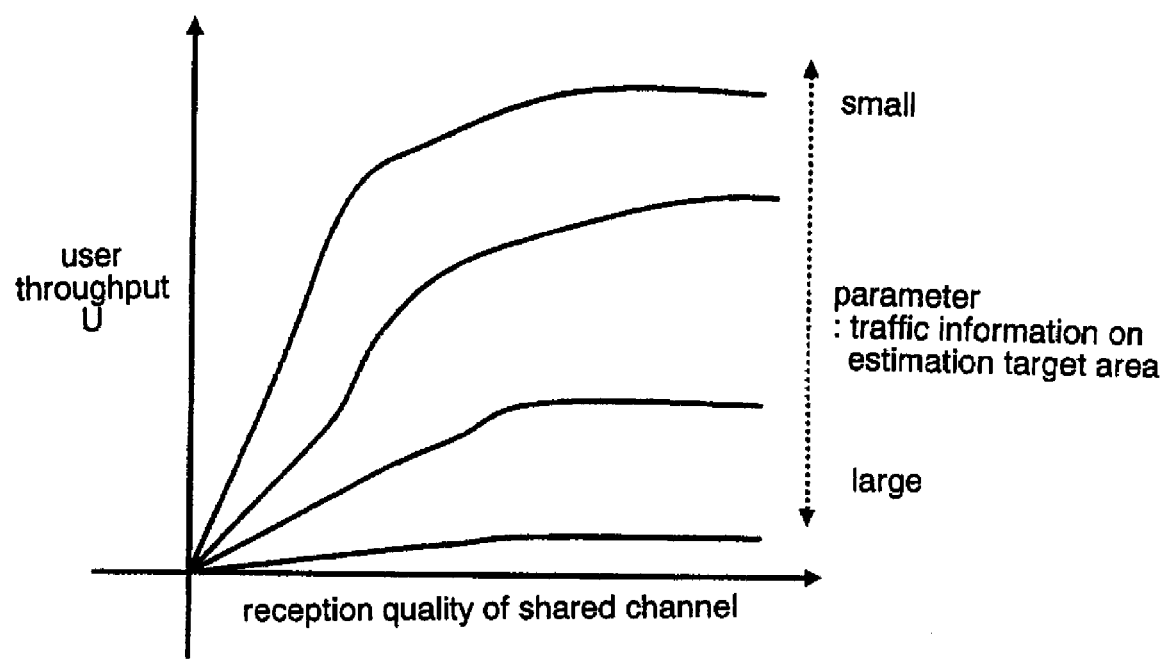
FIG. 3 is a graph for explaining an example of a user throughput calculating function used in exemplary embodiment 1 of the present invention.

FIG. 3 is a graph for explaining an example of user throughput calculating function f used in exemplary embodiment 1 of the present invention.

User throughput calculating function f can be given in the graph shown in FIG. 3 where the reception quality of the shared channel is represented on the lateral axis, user throughput is represented on the vertical axis and the traffic information on the estimation target area is given as a parameter.

In the present exemplary embodiment, the location of each user terminal in the cell, assumed by reception quality estimating means 11, and the estimated result of the user throughput at the location of each user terminal in the cell, estimated by user throughput estimating means 13, are output together.

Accordingly, it becomes possible to estimate the geographical distribution of the user throughput in the cell based on these outputs.

Figure 4:
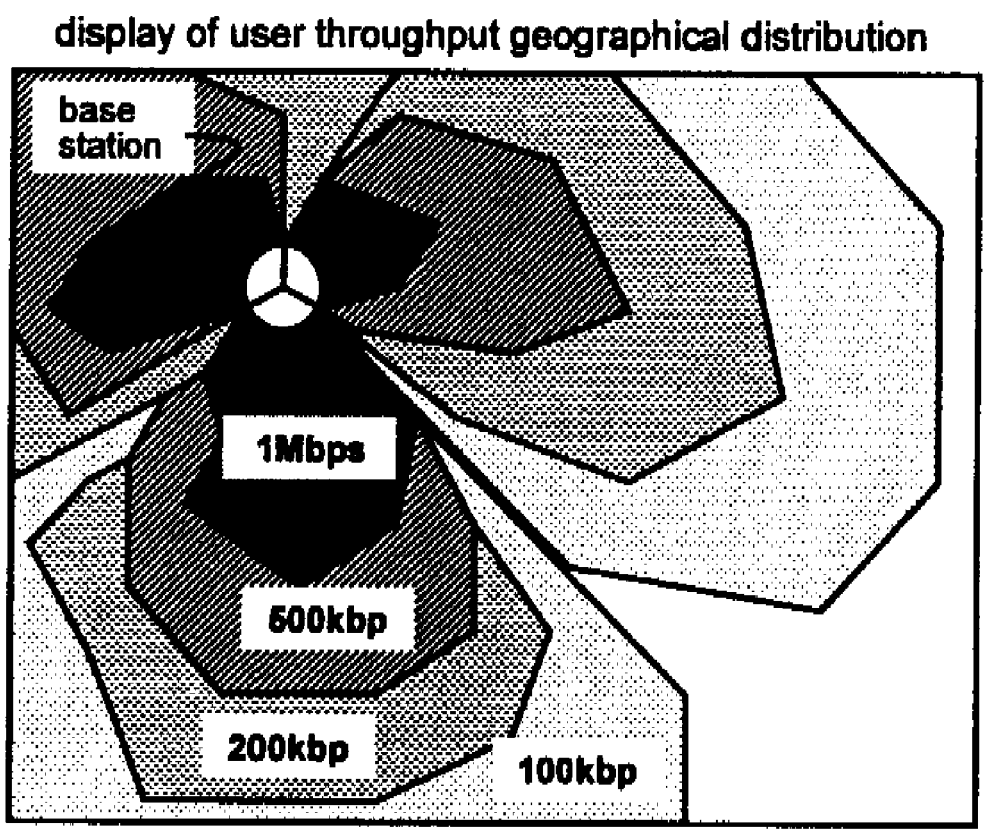
FIG. 4 is a chart showing a display example of the geographical distribution of user throughput using the estimated result of user throughput that was estimated in exemplary embodiment 1 of the present invention.

FIG. 4 is a chart showing a display example of the geographical distribution of user throughput using the estimated result of user throughput that was estimated in exemplary embodiment 1 of the present invention.

Referring to FIG. 4, there is shown a geographic distribution of user throughputs of user terminals around a base station having a three-sector configuration. As shown in FIG. 4, the geographical distribution of user throughputs is preferably displayed in a planar form and more preferably colored for easy visual understanding.

As described above, in the present exemplary embodiment user throughput estimating means 13 calculates the user throughput at the location of each user terminal in the cell by inputting the reception quality of the shared channel at the location of each user terminal in the cell, and the traffic information on the estimation target area into user throughput calculating function f.

Since a function like user throughput calculating function f has a definite output value that corresponds to its input, it is possible to determine the output value at the moment of time when the input is given. Accordingly, since it is not necessary for the estimating method using such a function to simulate in detail the process of wireless packet communication over a continuous period of time, in contrast to a conventional estimating method using a system level simulation, it is possible to estimate the geographic distribution of user throughput in a short time.

By the way, user throughput calculating function f enables estimation of user throughput based on only two pieces of information, the reception quality of the shared channel at the location of each user terminal in the cell and the traffic information on the estimation target area, as stated above. The reason why user throughput can be estimated based on only two pieces of information is as follows.

User throughput is basically determined depending on the frequency with which wireless resources are assigned to the user terminal and the transmission rate of the wireless link when the wireless resources are assigned. The frequency with which wireless resources are allotted to a user terminal is related to the degree of congestion of user terminals in the base station, i.e., the traffic in the estimation target area. On the other hand, the transmission rate of the wireless link is related to the reception quality of the shared channel in the wireless link. Further, as regards user throughput, there is a qualitative tendency that user throughput decreases if the degree of congestion of user terminals in the base station is high while user throughput increases if the degree of congestion of user terminals is low.

Further, in HSDPA, there is a tendency that if the reception quality of the shared channel is high, a modulating scheme with a high transmission rate is selected so that the transmission rate increases, and if the reception quality of the shared channel is low, a modulating scheme with a low transmission rate is selected so that the transmission rate decreases.

Also in other wireless packet communication schemes than HSDPA, if the reception quality of the shared channel is high, the error rate is low so that the effective transmission rate increases and if the reception quality of the shared channel is low, the error rate is high so that the effective transmission rate decreases. Accordingly, a tendency similar to that of the aforementioned HSDPA is shown.

As described heretofore, the correspondence relationship between the reception quality of the shared channel and the traffic information on the estimation target area, and user throughput is defined qualitatively. Accordingly, this correspondence relationship may be acquired and formulated beforehand utilizing the estimated result of user throughput by system level simulation, the actual measurement of user throughput received from the wireless network controller, the approximated and analyzed result of user throughput and others. In this way, it is possible to estimate user throughput based on only two pieces of information, the reception quality of the shared channel and the traffic information on the estimation target area.

In the above way, the method of estimating user throughput based on only two pieces of information, the reception quality of the shared channel and the traffic information on the estimation target area, can be said to be a markedly simplified method because the factors exerting influence on user throughput are extremely limited.

However, simplification of the estimating method entails some degree of deterioration in estimation accuracy. Nevertheless, since the estimated user throughput is approximated to the result of system level simulation or the like, it is possible to obtain a merit that the time for estimation can be sharply shortened with a sufficiently high estimation accuracy that is free from practical problems by exactly formulating user throughput calculating function f.

In particular, when proper values for the base station configuration are considered, it is important to determine them quickly by varying the base station configuration in different ways. Therefore, the quick estimating method of user throughput according to the present exemplary embodiment makes it possible to sharply shorten the time for considering the proper values of the base station configuration.

Exemplary Embodiment 2

Figure 5:
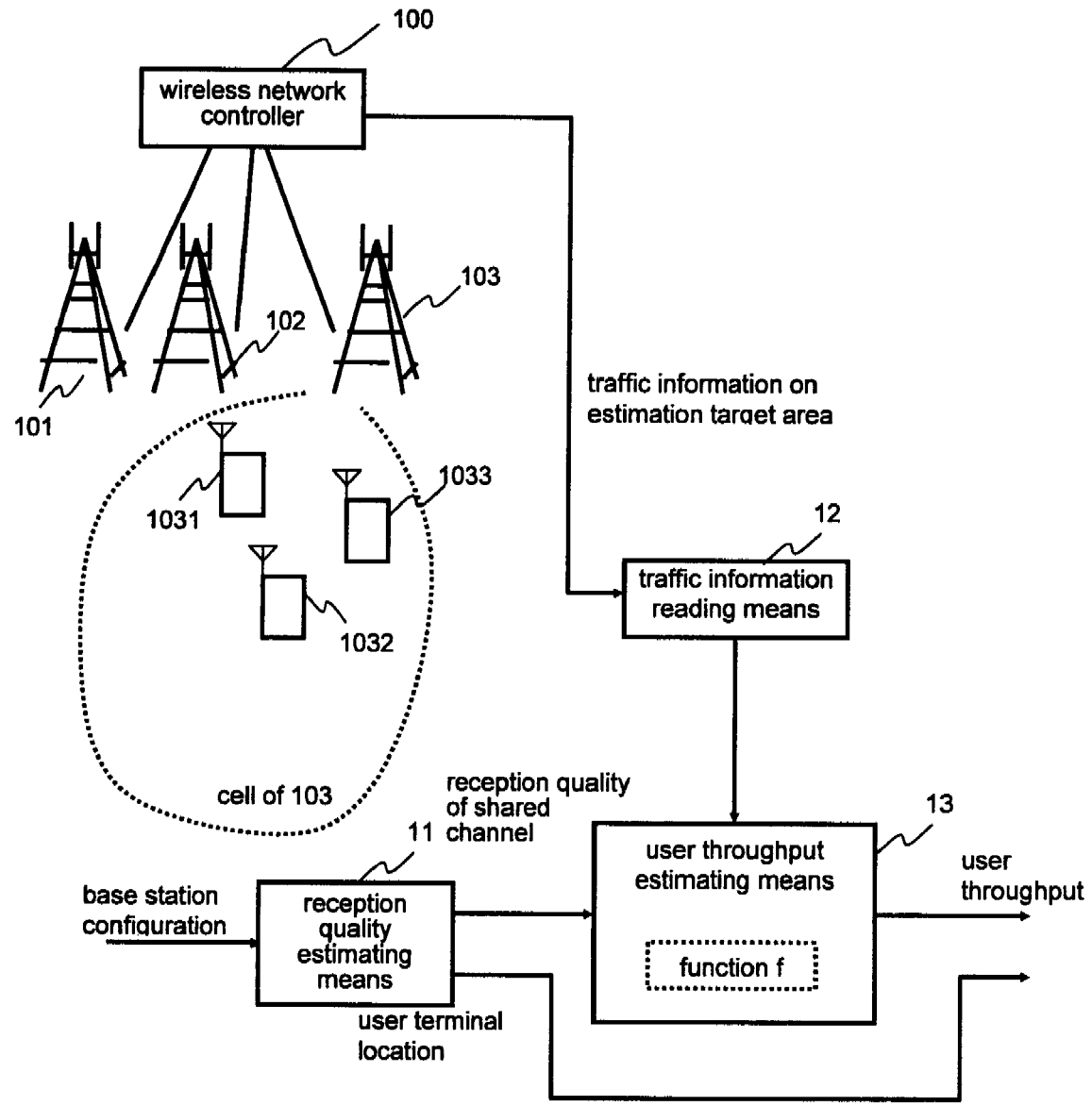
FIG. 5 is a block diagram showing a configuration of a user throughput geographical distribution estimating system according to exemplary embodiment 2 of the present invention.

FIG. 5 is a block diagram showing a configuration of a user throughput geographical distribution estimating system according to exemplary embodiment 2 of the present invention.

Referring to FIG. 5, the user throughput geographical distribution estimating system according to the present exemplary embodiment is different from exemplary embodiment 1 shown in FIG. 2, in the cellular system to which it is applied. That is, the cellular system to which the present exemplary embodiment is applied additionally includes wireless network controller 100. The configuration of the present exemplary embodiment, other than this, is the same as that of exemplary embodiment 1 shown in FIG. 2, so the same components are allotted with the same reference numerals.

Here, in FIG. 5, base stations 101 to 103 are connected to wireless network controller 100. Further, in the cell of base station 103, there exist three user terminals 1031 to 1033.

In the present exemplary embodiment, base stations 101 to 103 or wireless network controller 100 measures the number of user terminals in the cell, and outputs the measured number of user terminals as the traffic information on the estimation target area to traffic information reading means 12.

For example, when the user throughput in the cell of base station 103 is estimated, base station 103 or wireless network controller 100 measures the number of user terminals in the cell of base station 103 and outputs the measured number of user terminals as the traffic information on the estimation target area to traffic information reading means 12. Here FIG. 5 shows an example where wireless network controller 100 measures the number of user terminals in cell 103.

Similarly, when user throughput in base station 101 or 102 is estimated, the base station in question or wireless network controller 100 measures the number of user terminals in the cell of the base station and outputs the measured number of user terminals as the traffic information on the estimation target area to traffic information reading means 12.

Traffic information changes every moment. Accordingly, traffic information reading means 12 may read the traffic information in real time and output it to user throughput estimating means 13, or may output the maximum value of the traffic information which has been read for a fixed duration (e.g., one day) to user throughput estimating means 13.

As described above, in the present exemplary embodiment, since traffic information reading means 12 is configured so as to output the traffic information that was actually measured in the cellular system by traffic information reading means 12, it is possible for user throughput estimating means 13 to use the correct traffic information for user throughput estimation. As a result it is possible to improve the estimation accuracy of user throughput.

For example, if traffic information reading means 12 is configured so as to output the actual measurement of traffic information on the estimation target area in real time, user throughput estimating means 13 is able to estimate user throughput in real time. This makes it possible to find the position where user throughput is lowered within the cell.

Alternatively, if traffic information reading means 12 is configured so as to output the maximum value of the traffic information on the estimation target area which has been read for a fixed period (e.g., one day) to user throughput estimating means 13, it is possible to consider the proper values which can withstand the maximum traffic information over the fixed period, as the proper values for the base station configuration.

Exemplary Embodiment 3

Figure 6:
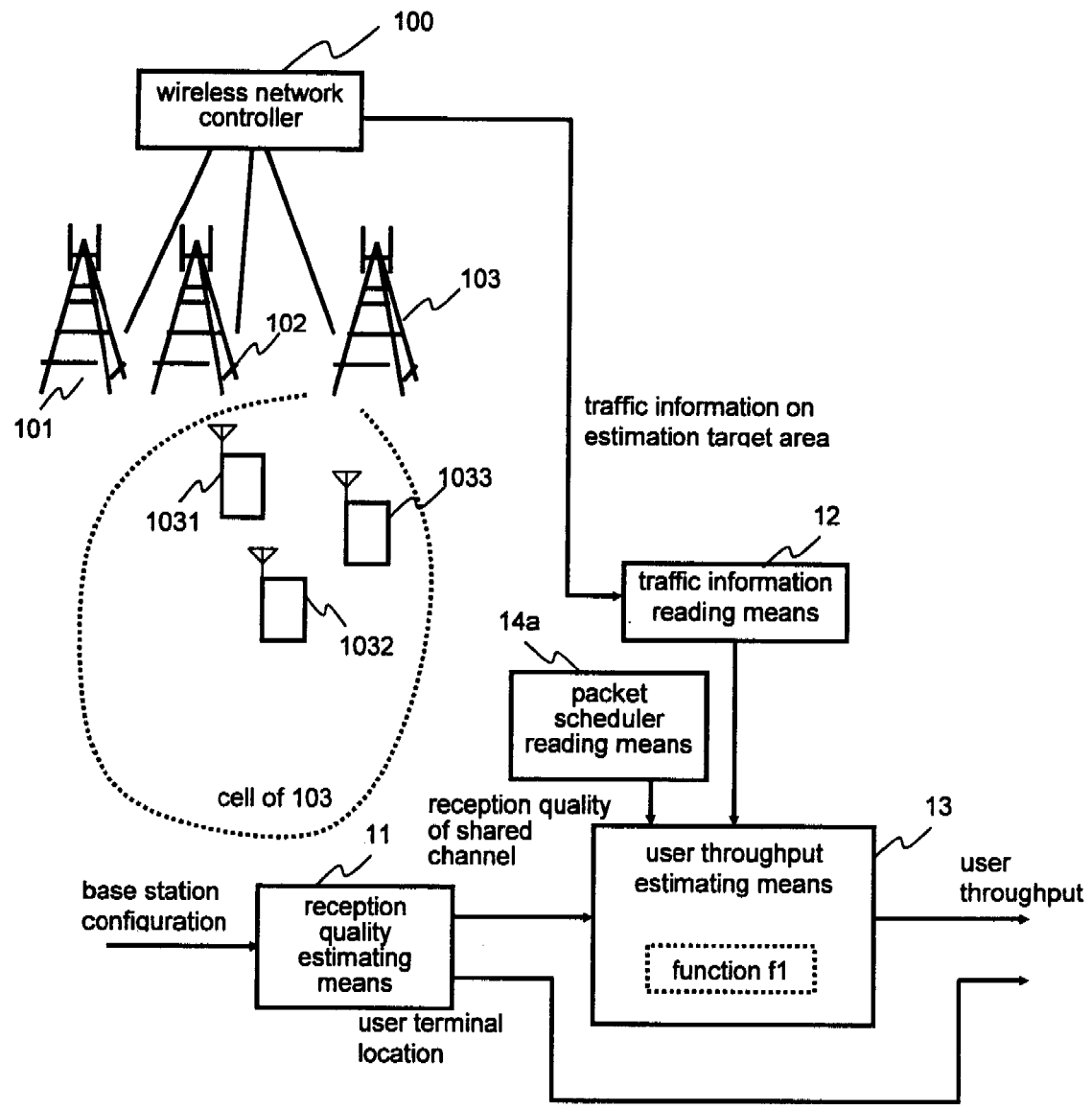
FIG. 6 is a block diagram showing a configuration of a user throughput geographical distribution estimating system according to exemplary embodiment 3 of the present invention.

FIG. 6 is a block diagram showing a configuration of a user throughput geographical distribution estimating system according to exemplary embodiment 3 of the present invention.

Referring to FIG. 6, the user throughput geographical distribution estimating system according to the present exemplary embodiment is different from exemplary embodiment 2 shown in FIG. 5, in that packet scheduler reading means 14a is added. The configuration of the present exemplary embodiment, other than this, is the same as that of exemplary embodiment 2 shown in FIG. 5, so the same components are allotted with the same reference numerals.

Packet scheduler reading means 14a reads the type of the packet scheduler (a means for scheduling the priority order of the packet transmission tasks to user terminals using the shared channel) being used at the base station, and outputs the read type of the packet scheduler to user throughput estimating means 13.

User throughput estimating means 13 incorporates user throughput calculating function f1 that additionally includes the packet scheduler type as a new parameter, instead of user throughput calculating function f used in the above exemplary embodiment 1.

In response to the input of the reception quality of the shared channel output from reception quality estimating means 11, traffic information on the estimated target area output from traffic information reading means 12 and packet scheduler type output from packet scheduler reading means 14a, user throughput estimating means 13 calculates the user throughput at the position of each user terminal in the cell using user throughput calculating function f1 and outputs the estimated result of user throughput.

User throughput calculating function f1 may be prepared for each packet scheduler type, or may be approximated and formulated as a continuous function in the same manner as in the aforementioned exemplary embodiment 1. When user throughput calculating function f1 is approximated and formulated as a continuous function, the following equation 2 may be used as an example of user throughput calculating function f1.

$$U = f_1(SIR, Load_{cell}, Schedular) = \frac{D(Schedular)}{E \times (1 + Load_{cell})^G} \times f \quad [\text{Equation 2}]$$

In equation 2, U represents user throughput, SIR the reception quality of the shared channel, Schedular the packet scheduler type, $Load_{cell}$ the traffic information on the estimation target area (=the number of user terminals in the cell; $Load_{cell} > 0$), D(Schedular) a constant determined depending on the packet scheduler type, E an arbitrary constant and G an arbitrary constant used as the power.

User throughput increases or decreases depending on the packet scheduler type. This is why equation 2 takes the form in which user throughput calculating function f used in the aforementioned exemplary embodiment 1 is multiplied by constant D depending on the packet scheduler type. Also, there is a tendency that the influence of the packet scheduler decreases as the traffic becomes higher. This is why equation 2 takes the form in which constant D is divided by the traffic information.

Figure 7:
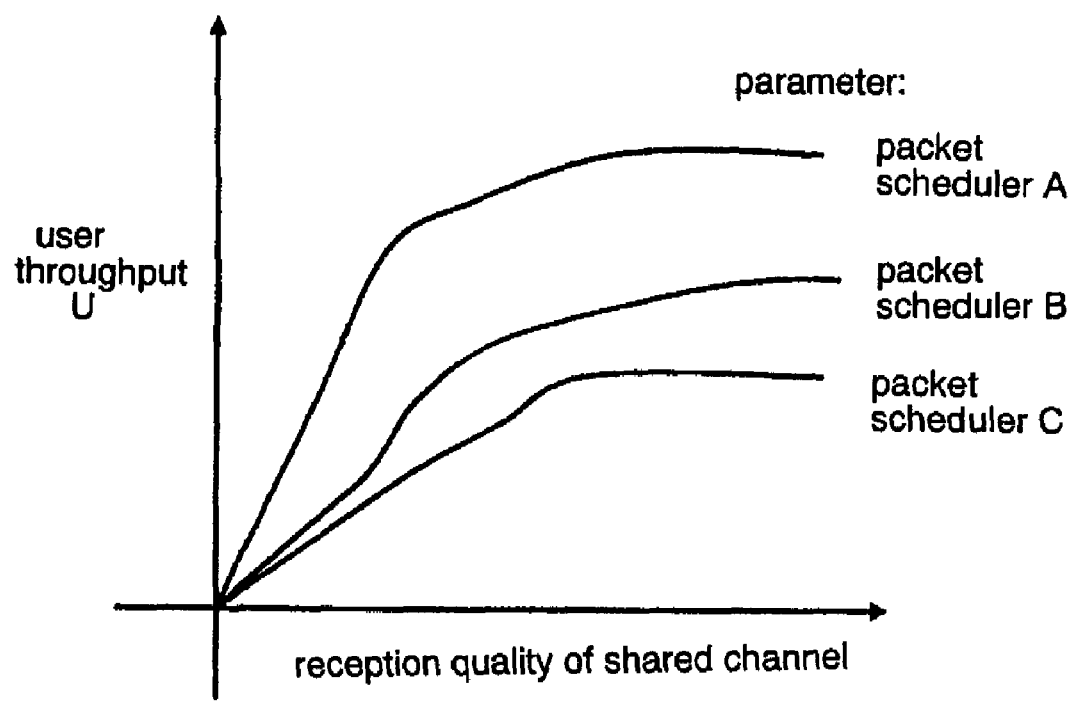
FIG. 7 is a graph for explaining an example of a user throughput calculating function used in exemplary embodiment 3 of the present invention.

FIG. 7 is a graph for explaining an example of user throughput calculating function f1 used in exemplary embodiment 3 of the present invention.

User throughput calculating function f1 can be given by a graph in which the reception quality of the shared channel is represented on the lateral axis, the user throughput is represented on the vertical axis and the packet scheduler type and the traffic information on the estimation target area are given as parameters. For example, when the traffic information on the estimation target area is fixed while the packet scheduler type is made different, user throughput calculating function f1 can be given by the graph shown in FIG. 7.

As described above, in the present exemplary embodiment user throughput estimating means 13 is configured to calculate user throughput by adding the packet scheduler type output from packet scheduler reading means 14a as a new parameter, so that this enables estimation of user throughput that is closer to reality. This configuration can further improve the estimation accuracy of user throughput.

Exemplary Embodiment 4

Figure 8:
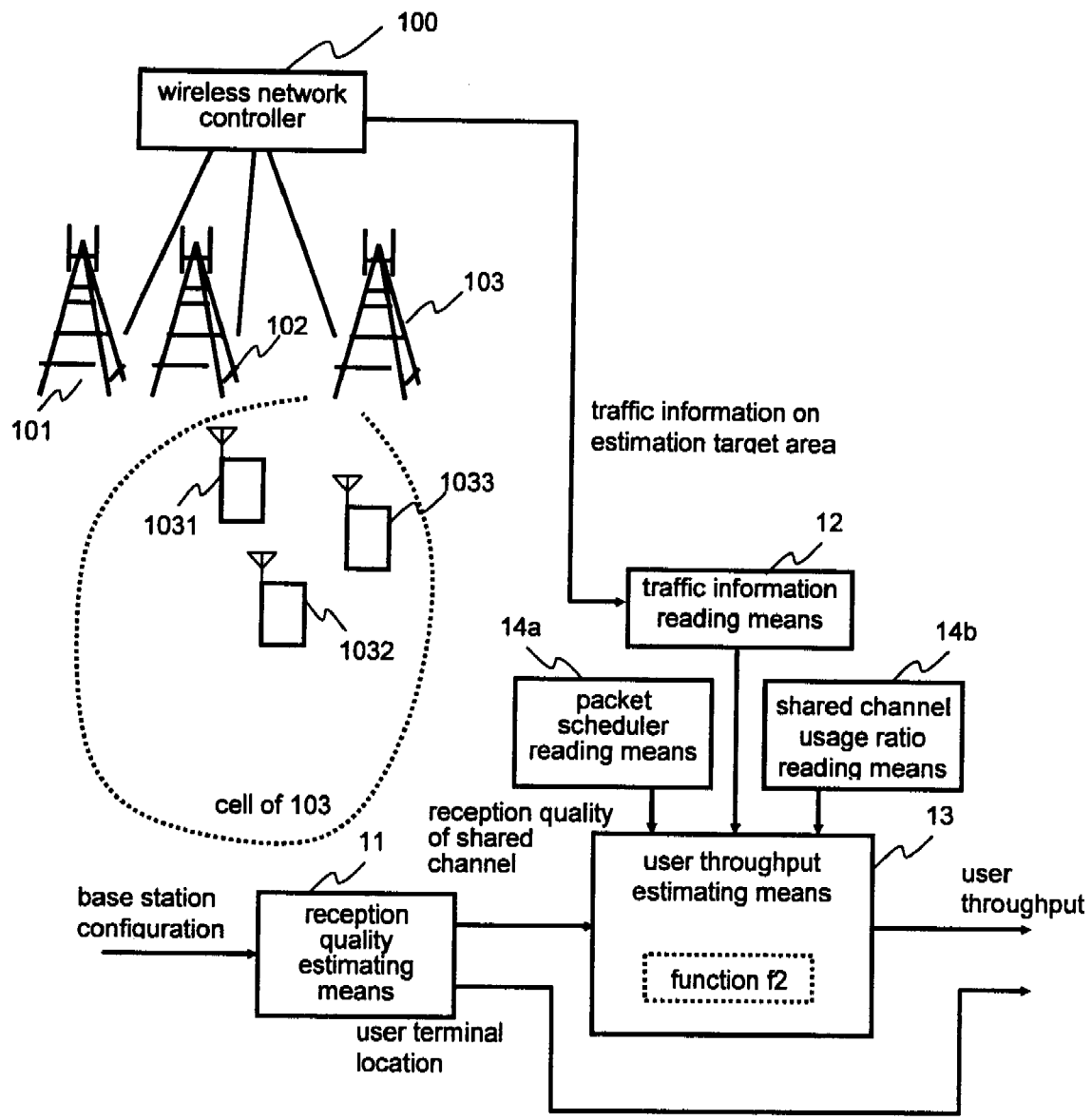
FIG. 8 is a block diagram showing a configuration of a user throughput geographical distribution estimating system according to exemplary embodiment 4 of the present invention.

FIG. 8 is a block diagram showing a configuration of a user throughput geographical distribution estimating system according to exemplary embodiment 4 of the present invention.

Referring to FIG. 8, the user throughput geographical distribution estimating system according to the present exemplary embodiment is different from exemplary embodiment 3 shown in FIG. 6, in that shared channel usage ratio reading means 14b is added. The configuration of the present exemplary embodiment, other than this, is the same as that of exemplary embodiment 3 shown in FIG. 6, so the same components are allotted with the same reference numerals.

Shared channel usage ratio reading means 14b reads the occupation ratio of the user terminals that perform wireless packet communications using the shared channel to all the user terminals (the user terminals that perform wireless packet communications using the shared channel and the user terminals that perform audio communications etc, without using the shared channel but using only their own individual channels that are allotted by the base station) in the cell, and outputs the read ratio to user throughput estimating means 13. Here, the ratio of the user terminals using the shared channel may be determined by shared channel usage ratio reading means 14b, based on the ownership of user terminals using the shared channel. Alternatively, if the ratio can be measured by wireless network controller 100, shared channel usage ratio reading means 14b may use the result that was actually measured by wireless network controller 100.

User throughput estimating means 13 incorporates user throughput calculating function f2 that additionally includes the ratio of the user terminals using the shared channel as a new parameter, instead of user throughput calculating function f1 used in the above exemplary embodiment 3.

In response to the input of the reception quality of the shared channel output from reception quality estimating means 11, the traffic information on the estimated target area output from traffic information reading means 12, the packet scheduler type output from packet scheduler reading means 14a and the ratio of the user terminals using the shared channel output from shared channel usage ratio reading means 14b, user throughput estimating means 13 calculates the user throughput at the position of each user terminal in the cell using user throughput calculating function f2 and outputs the estimated result of user throughput.

A user terminal that uses an individual channel only exerts a greater influence on traffic, compared to a user terminal that uses the shared channel. For example, since a user terminal that uses the shared channel uses wireless resources (the power and frequency of the base station) only when it needs, the usage frequency of wireless resources is low. On the other hand, a user terminal that uses an individual channel only continues to use the wireless resources of the individual channel that is allotted separately during communication, and also needs time for the connecting process, so that the usage frequency of wireless resources is high.

In other words, a user terminal that uses an individual channel only has a greater influence on increase in traffic, compared to a user terminal that uses the shared channel, hence the former results in the factor in the lowering of user throughput U.

Considering the above fact, when user throughput calculating function f2 is approximated and formulated as a continuous function in the same manner as in the aforementioned exemplary embodiment 1, the following equation 3 may be used as an example of user throughput calculating function f2.

$$U = f_2(SIR, Load_{cell}, Schedular, Ratio_{SCH})$$
$$= \frac{D(Schedular)}{J \times [\{Ratio_{SCH} + H \times (1 - Ratio_{SCH})\} \times Load_{cell}]^G} \times f$$

[Equation 3]

In equation 3, U represents user throughput, SIR the reception quality of the shared channel, $Load_{cell}$ the traffic information on the estimation target area (=the number of user terminals in the cell; $Load_{cell}>0$), Schedular the packet scheduler type, $Ratio_{SCH}$ the ratio of the user terminals using the shared channel, D(Schedular) a constant determined depending on the packet scheduler type, G an arbitrary constant used as the power, H a coefficient representing the influence of the user terminals that use individual channels only on traffic and J an arbitrary constant.

Equation 3 is basically the same as equation 2 used in the above exemplary embodiment 3, but is formulated by approximating the traffic in the estimation target area to the traffic that considers the degree of influence given by the user terminals that use individual channels only.

Figure 9:
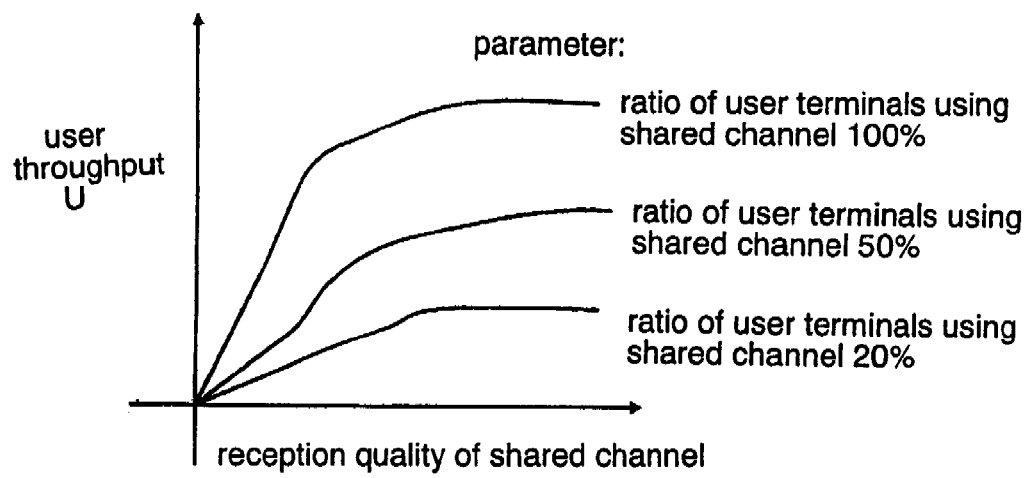
FIG. 9 is a graph for explaining an example of a user throughput calculating function used in exemplary embodiment 4 of the present invention.

In the denominator in equation 3, $(1-Ratio_{SCH})$ represents the ratio of the user terminals that use individual channels only. The result of this ratio multiplied by coefficient H represents the effective ratio of the user terminals that use individual channels only and affect traffic. The result obtained by adding $Ratio_{SCH}$, i.e., the ratio of the user terminals using the shared channel, to the above ratio and multiplying the sum by traffic information $Load_{cell}$ presents an approximation of the traffic in the estimation target area, and is represented by $[\{Ratio_{SCH}+H \times (1-Ratio_{SCH})\} \times Load_{cell}]$ FIG. 9 is a graph for explaining the example of user throughput calculating function f2 used in exemplary embodiment 4 of the present invention.

User throughput calculating function f2 can be given by a graph in which the reception quality of the shared channel is represented on the lateral axis, user throughput is represented on the vertical axis and the ratio of the user terminals using the shared channel, the packet scheduler type and the traffic information on the estimation target area are given as parameters. For example, when the packet scheduler type and the traffic information on the estimation target area are fixed while the ratio of the user terminals using the shared channel is made different, user throughput calculating function f2 can be given by the graph shown in FIG. 9.

As described above, in the present exemplary embodiment, user throughput estimating means 13 is configured to calculate user throughput by adding the ratio of the user terminals using the shared channel, output from shared channel usage ratio reading means 14b as a new parameter, so that this enables estimation of user throughput that is closer to reality. Hence this configuration can further improve the estimation accuracy of user throughput.

As regards the future prospects of the cellular system, it is expected that the ratio of the user terminals using the shared channel gradually increases with the spread of user terminals that support HSDPA. It is thought that, as the cellular systems mature and develop, the user throughput estimating method, as described above, will be particularly effective.

Exemplary Embodiment 5

The user throughput geographical distribution estimating system according to exemplary embodiment 5 of the present invention is the same as those of exemplary embodiments 1 to 4, except that the traffic information on the estimation target area is defined as system throughput.

User throughput is a throughput as seen from the viewpoint of the user terminal side, i.e the throughput measured on the user terminal side. In contrast to this, system throughput is a throughput as seen from the viewpoint of the side of a base station as a system, i.e the throughput measured on the base station side. System throughput represents the total number of bits of all the packets that are transmitted from the base station to all the user terminals in the cell per unit time.

As described in exemplary embodiment 1, the traffic information on the estimation target area is a quantitative value related to the number of user terminals in the cell. Here, since the frequency, time and power of a single cell are limited, naturally the amount of communications that can be handled by a single cell is limited. Taking this into consideration, the traffic information on the estimation target area can be understood to be the degree of congestion of user terminals in the cell.

For this reason, in the present exemplary embodiment, the system throughput of the base station, which shows a tendency towards being proportional to the number of user terminals, is used as the traffic information on the estimation target area.

Exemplary Embodiment 6

The user throughput geographical distribution estimating system according to exemplary embodiment 6 of the present invention is the same as those of exemplary embodiments 1 to 5, except that the traffic information on the estimation target area is defined as the average of the number of concurrent connections of user terminals in a cell.

The average of the number of concurrent connections of user terminals in a cell is the number that is obtained by averaging the number of the user terminals in the cell that are concurrently connected to the base station, over a fixed period of time. This value is a value measurable at the base station, and obviously has a tendency towards being proportional to the number of user terminals in the cell.

For this reason, in the present exemplary embodiment, the average of the number of concurrent connections of user terminals in a cell, which shows a tendency towards being proportional to the number of user terminals, is used as the traffic information on the estimation target area.

Exemplary Embodiment 7

The user throughput geographical distribution estimating system according to exemplary embodiment 6 of the present invention is the same as those of exemplary embodiments 1 to 6, except that the traffic information on the estimation target area is defined as the usage time ratio of packet transmission power at a base station in a cell.

The usage time ratio of packet transmission power at a base station in a cell is the temporal usage ratio of the packet transmission power used for packet transmission from the base station to user terminals in the cell.

Since the base station does not perform packet transmission if there is no user terminal in the cell, the temporal usage ratio of packet transmission power at the base station decreases. In contrast, if there are many user terminals in the cell, the temporal usage ratio of packet transmission power at the base station increases. This means that this value is a measurable value at the base station and obviously has a tendency towards being proportional to the number of user terminals in the cell.

For this reason, in the present exemplary embodiment, the temporal usage ratio of transmission power at the base station in the cell, which has a tendency towards being proportional to the number of user terminals, is used as the traffic information on the estimation target area.

Exemplary Embodiment 8

Figure 10:
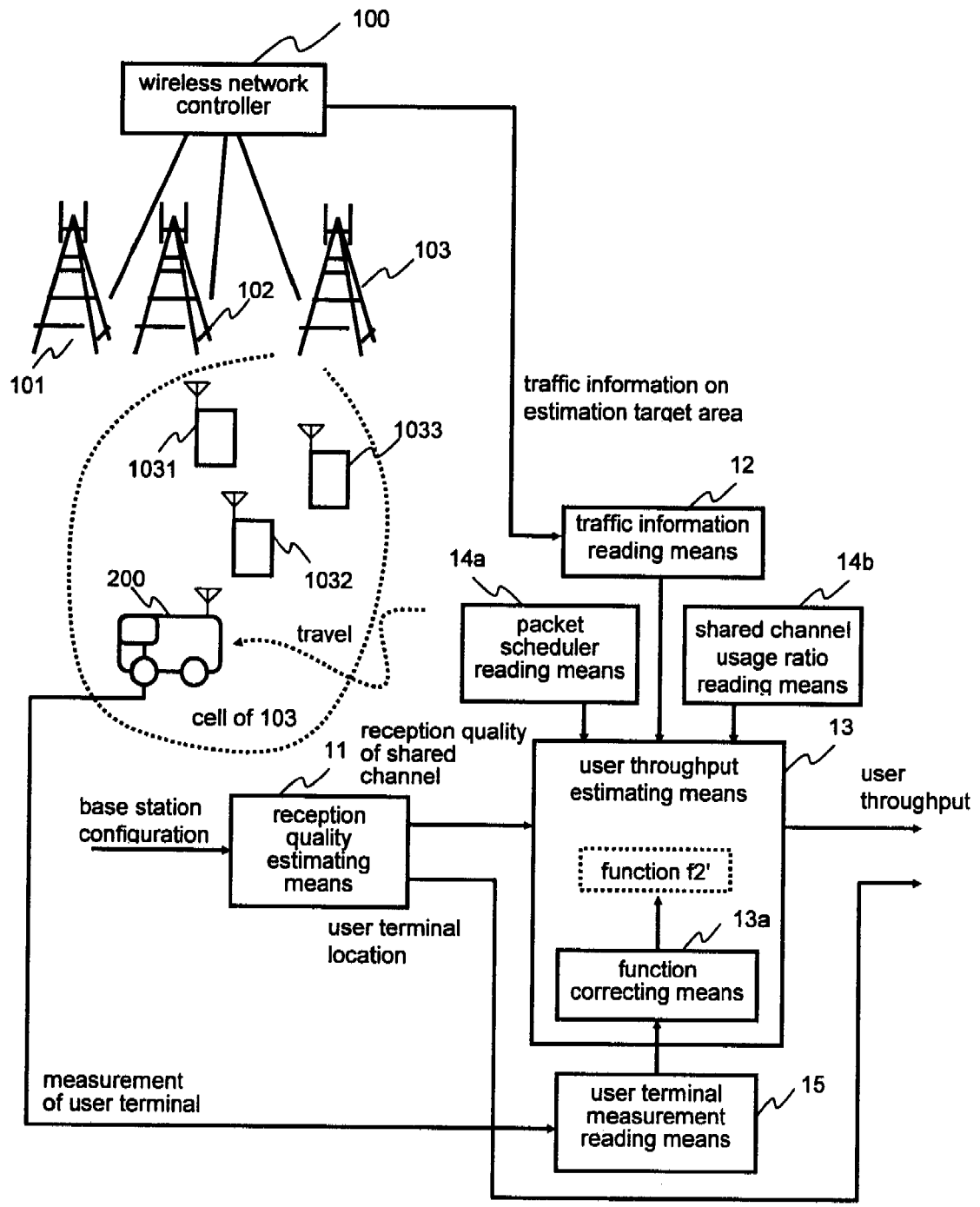
FIG. 10 is a block diagram showing a configuration of a user throughput geographical distribution estimating system according to exemplary embodiment 8 of the present invention.

FIG. 10 is a block diagram showing a configuration of a user throughput geographical distribution estimating system according to exemplary embodiment 8 of the present invention.

Referring to FIG. 10, the user throughput geographical distribution estimating system according to exemplary embodiment 8 of the present invention is different from exemplary embodiment 4 shown in FIG. 8, in that user terminal measuring means 200, user terminal measurement reading means 15 and function correcting means 13a provided inside user throughput estimating means 13 are added. The configuration of the present exemplary embodiment, other than this, is the same as that of exemplary embodiment 4 shown in FIG. 8, so the same components are allotted with the same reference numerals.

User terminal measuring means 200, for example, travels in the cell of base station 103 when user throughput in the cell of base station 103 is estimated, and measures the reception quality of the shared channel and user throughput at the same time at the locations of user terminals 1031 to 1033 in the cell.

User terminal measurement reading means 15 reads the measurement of the reception quality of the shared channel and the measurement of user throughput, measured by user terminal measuring means 200. User terminal measurement reading means 15 then takes the average of the read measurements over a fixed period of time and creates function fc that represents the relationship between the measurement of the reception quality of the shared channel and the measurement of user throughput. The reason why the averaging is done is that it is effective to use the average value of user throughput for the reception quality of the shared channel because the variational range of user throughput for the reception quality of the shared channel is large. Further, user terminal measurement reading means 15 outputs function fc on the measurements to function correcting means 13a in user throughput estimating means 13.

Figure 11:
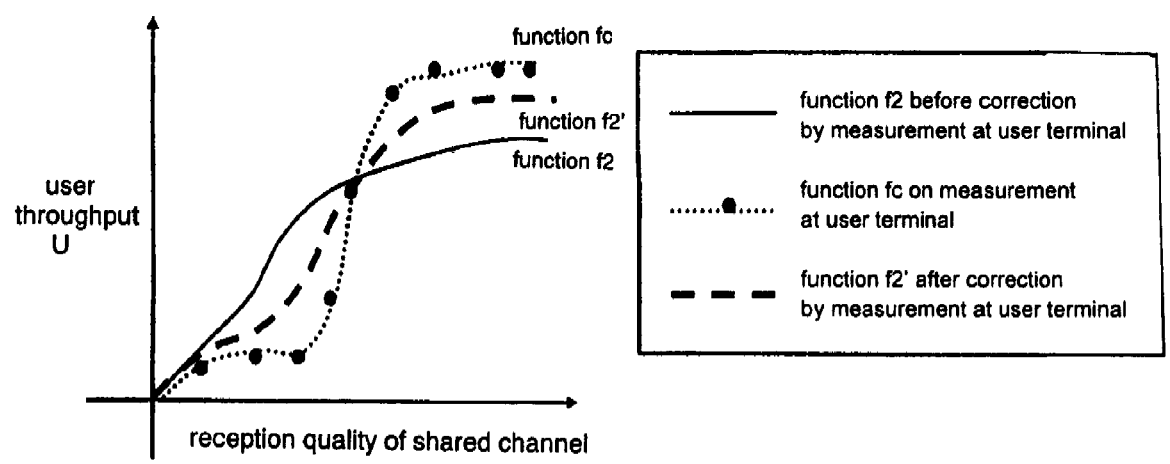
FIG. 11 is a graph for explaining an example of a method for correcting a user throughput calculating function based on a function of actual measurement at user terminals.

Function correcting means 13a, based on function fc on the measurements output from user terminal measurement reading means 15, corrects user throughput calculating function f2. Specifically, function correcting means 13a makes correction by taking the average of function fc on the measurements and function f2 before correction to output corrected function f2' as shown in FIG. 11. Function correcting means 13a can use the following equation 4, as the above specific method for correcting.

$$f'_2 = \frac{f_2 + f_c}{2} \quad \text{[Equation 4]}$$

In equation 4, f2' is a user throughput calculating function after correction, f2 is a user throughput calculating function before correction, fc is a function on the measurements at user terminals.

As an alternative correcting method, function correcting means 13a may use a method of taking a weighted average of function fc on measurements and function f2 before correction, by taking into account the data amount of the measurements and the reliability of the measurements.

User throughput estimating means 13 receives as its input the same parameters as those of exemplary embodiment 4 and estimates user throughput using user throughput calculating function f2 that was corrected by function correcting means 13a.

As described above, in the present exemplary embodiment, user throughput estimating means 13 is configured so as to calculate user throughput using function f2' that is obtained by correcting user throughput function f2 in accordance with the measurements of the reception quality of the shared channel and the measurements of user throughput. Accordingly, it is possible to make an estimation of user throughput that is closer to reality. This configuration can further improve the estimation accuracy of user throughput.

As described above, in the present invention, user throughput is estimated by inputting the reception quality of the shared channel at the location of the user terminal and the traffic information on the estimation target area into the user throughput calculating function.

Since a function like the user throughput calculating function has a definite output value that corresponds to its input, it is possible to determine the output value at the moment of time when the input is given. Accordingly, since it is not necessary for the estimating method that use such a function to simulate in detail the process of user terminals that share the shared channel based on control of the packet scheduler, at a high temporal resolution, in contrast to a conventional estimating method that use a system level simulation, it is possible to estimate the geographic distribution of user throughput in a short time.

Further, in the present exemplary embodiment, since the estimated result by system level simulation and the like is reflected in the preparing the user throughput calculating function, it is possible to improve the estimation accuracy of user throughput.

Further, in the present invention, it is also possible to provide a configuration in which actual measurement is used as the traffic information on the estimation target area that is to be the parameter for the user throughput calculating function. That is, in the present invention, a value close to reality can be used as the input value to the user throughput calculating function, hence this makes it possible to improve the estimation accuracy of user throughput.

Still more, in the present invention, it is also possible to provide a configuration in which the user throughput calculating function is corrected in accordance with the relationship between the measurement of the reception quality of the shared channel and the measurement of user throughput at the location of the user terminal. Accordingly, in the present invention, it is possible to use a user throughput calculating function in accordance with the relationship between the reception quality of the shared channel and the user throughput, which are close to reality, hence it is possible to estimate user throughput with precision.

The invention claimed is:

1. A user throughput geographical distribution estimating system for estimating the geographical distribution of user throughput in a cellular system, including user terminals and a base station for effecting wireless packet communications with user terminals inside in its own cell using a shared channel, comprising:
   a reception quality estimating means for estimating the reception quality of the shared channel at the location of a user terminal in said cell; a traffic information reading means for reading the traffic information on the estimation target area in which estimation of said reception quality was performed;
   a user throughput estimating means for estimating user throughput at the location of a user terminal in said cell, using a user throughput calculating function that receives as its input said reception quality of the shared channel at the location of the user terminal in said cell and said traffic information on the estimation target area and calculates user throughput; and
   a user terminal measuring means that travels in said cell for making actual measurement of said reception quality of the shared channel and said user throughput at the locations of user terminals in said cell, wherein said user throughput estimating means includes a function correcting means for correcting said user throughput calculating function in accordance with the relationship between the measurement of said reception quality of the shared channel and the measurement of said user throughput.

2. The system according to claim 1, wherein said cellular system further comprises a wireless network controller connected to said base station, said traffic information reading means reads said traffic information on the estimation target area, measured at said base station or at said wireless network controller.

3. The system according to claim 1, further comprising a packet scheduler reading means for reading the packet scheduler type of said base station, wherein said user throughput estimating means also uses said packet scheduler type as its input value for said user throughput calculating function.

4. The system according to claim 1, further comprising a means for reading the occupation ratio of the user terminals that perform wireless communications using said shared channel to all the user terminals in said cell, wherein said user throughput estimating means uses the ratio of the user terminals that use said shared channel as its input value for said user throughput calculating function.

5. The system according to claim 1, wherein said traffic information on the estimation target area is the number of user terminals in said cell.

6. The system according to claim 1, wherein said traffic information on the estimation target area is the system throughput of said base station.

7. The system according to claim 1, wherein said traffic information on the estimation target area is the number that is obtained by taking the average of the number of user terminals in the cell that are concurrently connected to said base station, over a fixed period of time.

8. The system according to claim 1, wherein said traffic information on the estimation target area is the temporal usage ratio of the packet transmission power which the base station uses to transmit packets to the user terminals in said cell.

9. A user throughput geographical distribution estimating method for estimating the geographical distribution of user throughput in a cellular system, including user terminals and a base station for effecting wireless packet communications with user terminals inside in its own cell using a shared channel, comprising:
   a reception quality estimating step for estimating the reception quality of the shared channel at the location of a user terminal in said cell;
   a traffic information reading step for reading the traffic information on the estimation target area in which estimation of said reception quality was performed;
   a user throughput estimating step for estimating user throughput at the location of a user terminal in said cell, using a user throughput calculating function that receives as its input said reception quality of the shared channel at the location of the user terminal in said cell and said traffic information on the estimation target area and calculates user throughput; and
   a making actual measurement step for making actual measurement of said reception quality of the shared channel and said user throughput at the locations of user terminals in said cell as a user terminal measuring means that travels in the cell, wherein in said user throughput estimating step, said user throughput calculating function is corrected in accordance with the relationship between the measurement of said reception quality of the shared channel and the measurement of said user throughput.

10. The method according to claim 9, wherein said cellular system further comprises a wireless network controller connected to said base station, in said traffic information reading step, said traffic information on the estimation target area, measured at said base station or at said wireless network controller, is read.

11. The method according to claim 9, further comprising a step of reading the packet scheduler type of said base station, wherein in said user throughput estimating step, said packet scheduler type is also used as an input value for said user throughput calculating function.

12. The method according to claim 9, further comprising a step for reading the occupation ratio of the user terminals that perform wireless communications using said shared channel to all the user terminals in said cell, wherein in said user throughput estimating step, the ratio of the user terminals that use said shared channel is also used as its input value for said user throughput calculating function.

13. The method according to claim 9, wherein said traffic information on the estimation target area is the number of user terminals in said cell.

14. The method according to claim 9, wherein said traffic information on the estimation target area is the system throughput of said base station.

15. The method according to claim 9, wherein said traffic information on the estimation target area is the number that is obtained by taking the average of the number of user terminals in the cell that are concurrently connected to said base station, over a fixed period of time.

16. The method according to claim 9, wherein said traffic information on the estimation target area is the temporal usage ratio of the packet transmission power which the base station uses to transmit packets to the user terminals in said cell.

* * * * *